(12) United States Patent
Wegelin et al.

(10) Patent No.: US 10,057,709 B2
(45) Date of Patent: Aug. 21, 2018

(54) SYSTEMS FOR PROVIDING CONDITION-BASED DATA FROM A USER INTERACTIVE DEVICE

(71) Applicant: GOJO Industries, Inc., Akron, OH (US)

(72) Inventors: Jackson William Wegelin, Stow, OH (US); Tamara Mae Cross, Uniontown, OH (US); Jason Michael Slater, Barberton, OH (US); Mark Adam Bullock, Wooster, OH (US); Jeffrey William Hall, Hudson, OH (US); Derek Matthew Smith, San Diego, CA (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 15/346,833

(22) Filed: Nov. 9, 2016

(65) Prior Publication Data
US 2017/0134887 A1    May 11, 2017

Related U.S. Application Data

(60) Provisional application No. 62/252,755, filed on Nov. 9, 2015, provisional application No. 62/271,033, filed on Dec. 22, 2015.

(51) Int. Cl.
| | | |
|---|---|---|
| *H04B 5/00* | (2006.01) | |
| *H04W 4/00* | (2018.01) | |
| *H04L 29/08* | (2006.01) | |
| *H04L 29/06* | (2006.01) | |
| *H04W 8/00* | (2009.01) | |
| *H04W 64/00* | (2009.01) | |
| *H04W 4/80* | (2018.01) | |
| *H04W 84/04* | (2009.01) | |
| *H04W 84/12* | (2009.01) | |

(Continued)

(52) U.S. Cl.
CPC ............. *H04W 4/008* (2013.01); *H04L 67/12* (2013.01); *H04L 67/26* (2013.01); *H04L 67/42* (2013.01); *H04W 4/80* (2018.02); *H04W 8/005* (2013.01); *H04W 64/00* (2013.01); *H04W 84/042* (2013.01); *H04W 84/12* (2013.01); *H04W 88/02* (2013.01); *H04W 88/08* (2013.01)

(58) Field of Classification Search
CPC ........ G08B 3/00; G08B 3/04; G08B 13/1436; G08B 21/22; H04B 5/00; H04W 12/00
USPC .... 455/500, 556.1, 557, 456.1, 456.2, 456.3
See application file for complete search history.

(56) References Cited

U.S. PATENT DOCUMENTS

| | | |
|---|---|---|
| 5,370,267 A | 12/1994 | Schroeder |
| 5,625,659 A | 4/1997 | Sears |

(Continued)

*Primary Examiner* — Ping Hsieh
(74) *Attorney, Agent, or Firm* — Calfee, Halter & Griswold LLP

(57) ABSTRACT

A user interactive device includes a housing, a user interactive mechanism carried by the housing, a wireless transmitter storing application identifying data identifying an application associated with the user interactive device, and a controller in circuit communication with the wireless transmitter, wherein the controller is configured to communicate device condition data to the wireless transmitter. The wireless transmitter is configured to wirelessly transmit a broadcast data packet including the application identifying data and the device condition data.

19 Claims, 4 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 6,065,639 A | 5/2000 | Maddox et al. | |
| 7,271,728 B2 | 9/2007 | Taylor et al. | |
| 8,245,879 B2 | 9/2012 | Wegelin | |
| 8,350,706 B2 | 1/2013 | Wegelin et al. | |
| 8,558,701 B2 | 10/2013 | Wegelin et al. | |
| 8,622,242 B2 | 1/2014 | Pelfrey | |
| 8,717,177 B2 | 5/2014 | Cartner | |
| 8,757,433 B2 | 6/2014 | Pelfrey et al. | |
| 8,823,525 B2 | 9/2014 | Cartner et al. | |
| 8,847,752 B2 | 9/2014 | Wegelin et al. | |
| 8,965,595 B2 | 2/2015 | Wegelin | |
| 8,991,649 B2 | 3/2015 | Wegelin et al. | |
| 9,131,811 B2 | 9/2015 | Wegelin et al. | |
| 9,262,905 B2 | 2/2016 | Wegelin et al. | |
| 9,265,384 B2 | 2/2016 | Wegelin et al. | |
| 9,311,790 B2 | 4/2016 | Wegelin et al. | |
| 9,349,274 B2 | 5/2016 | Wegelin et al. | |
| 9,357,888 B2 | 6/2016 | Wegelin et al. | |
| 9,412,263 B2 | 8/2016 | Pelfrey | |
| 9,443,357 B2 | 9/2016 | Wegelin et al. | |
| 9,514,662 B2 | 12/2016 | Pelfrey et al. | |
| 9,524,632 B2 | 12/2016 | Moore | |
| 9,580,210 B2 | 2/2017 | Wegelin et al. | |
| 9,633,543 B2 | 4/2017 | Wegelin et al. | |
| 9,633,544 B2 | 4/2017 | Wegelin et al. | |
| 9,633,545 B2 | 4/2017 | Wegelin et al. | |
| 9,728,070 B2 | 8/2017 | Wegelin et al. | |
| 9,770,141 B2 | 9/2017 | Wegelin et al. | |
| 2006/0277065 A1 | 12/2006 | Guten et al. | |
| 2007/0008146 A1 | 1/2007 | Taylor et al. | |
| 2009/0195385 A1* | 8/2009 | Huang | G06F 19/327 340/572.1 |
| 2010/0173581 A1 | 7/2010 | Dolan | |
| 2010/0230435 A1 | 9/2010 | Wegelin | |
| 2010/0332022 A1 | 12/2010 | Wegelin et al. | |
| 2011/0169643 A1 | 7/2011 | Cartner | |
| 2011/0169645 A1 | 7/2011 | Cartner et al. | |
| 2011/0196720 A1 | 8/2011 | Guten et al. | |
| 2012/0012914 A1 | 5/2012 | Wegelin et al. | |
| 2012/0245729 A1 | 9/2012 | Wegelin et al. | |
| 2012/0274468 A1 | 11/2012 | Wegelin et al. | |
| 2013/0001254 A1 | 1/2013 | Pelfrey et al. | |
| 2013/0068791 A1 | 3/2013 | Pelfrey et al. | |
| 2013/0076514 A1 | 3/2013 | Wegelin et al. | |
| 2014/0015670 A1 | 1/2014 | Wegelin et al. | |
| 2014/0074285 A1 | 3/2014 | Wegelin et al. | |
| 2014/0197194 A1 | 7/2014 | Wegelin et al. | |
| 2014/0290960 A1 | 8/2014 | Ciavarella et al. | |
| 2014/0266575 A1 | 9/2014 | Pelfrey | |
| 2014/0279603 A1 | 9/2014 | Ortiz et al. | |
| 2014/0361898 A1 | 12/2014 | Wegelin et al. | |
| 2014/0366264 A1 | 12/2014 | Ciavarella et al. | |
| 2015/0206415 A1 | 7/2015 | Wegelin et al. | |
| 2015/0228181 A1* | 8/2015 | Himmelmann | G08B 21/245 340/573.1 |
| 2015/0254965 A1 | 9/2015 | Moore | |
| 2015/0258003 A1 | 9/2015 | Copeland et al. | |
| 2015/0291314 A1 | 10/2015 | Wegelin et al. | |
| 2015/0320265 A1 | 11/2015 | Bullock et al. | |
| 2015/0332579 A1 | 11/2015 | Wegelin et al. | |
| 2016/0005328 A1 | 1/2016 | O'Toole et al. | |
| 2016/0110989 A1 | 4/2016 | Wegelin et al. | |
| 2016/0128520 A1 | 5/2016 | Wegelin et al. | |
| 2016/0140832 A1 | 5/2016 | Moore | |
| 2016/0180688 A1 | 6/2016 | O'Toole | |
| 2016/0240070 A1 | 8/2016 | Wegelin et al. | |
| 2016/0240071 A1 | 8/2016 | Wegelin et al. | |
| 2016/0240072 A1 | 8/2016 | Wegelin et al. | |
| 2016/0274596 A1 | 9/2016 | Buell | |
| 2016/0292992 A1 | 10/2016 | Ortiz et al. | |
| 2016/0297577 A1 | 10/2016 | Pelfrey | |
| 2017/0004287 A1 | 1/2017 | O'Toole | |
| 2017/0055104 A1 | 2/2017 | Wegelin et al. | |
| 2017/0061726 A1 | 3/2017 | Wegelin | |
| 2017/0100002 A1 | 4/2017 | Wegelin et al. | |
| 2017/0134887 A1 | 5/2017 | Wegelin et al. | |
| 2017/0229002 A1 | 8/2017 | Wegelin et al. | |

* cited by examiner

SYSTEMS FOR PROVIDING CONDITION-BASED DATA FROM A USER INTERACTIVE DEVICE

RELATED APPLICATIONS

This application claims the benefits of, and priority to, U.S. Provisional Patent Application Ser. No. 62/252,755, filed on Nov. 9, 2015 and titled ELECTRONIC MONITORING SYSTEM and to U.S. Provisional Patent Application Ser. No. 62/271,033, filed on Dec. 22, 2015 and entitled SYSTEMS FOR PROVIDING CONDITION-BASED DATA FROM A USER INTERACTIVE DEVICE. Both of which are incorporated herein by reference in their entirety.

BACKGROUND

Public user interactive devices, such as dispensers, hand dryers, and vending machines, are generally intended to operate autonomously through simple user interaction, without needing frequent maintenance or intervention from an owner or administrator of the device. While a condition of the device may be readily known to the user (e.g., low/empty fluid condition in a dispenser, low/depleted battery condition), a typical public user of a device is unlikely to take steps to notify the owner or administrator of the device of such conditions of the device.

SUMMARY

According to an exemplary embodiment of the present application, a dispenser includes a housing, a container carried by the housing for holding a fluid, an outlet in fluid communication with the container, a dispensing mechanism disposed in the housing and operable to supply the fluid from the container to the outlet, a wireless transmitter storing application identifying data identifying an application associated with the user interactive device, and a controller in circuit communication with the wireless transmitter, wherein the controller is configured to communicate dispenser condition data to the wireless transmitter. The wireless transmitter is configured to wirelessly transmit a broadcast data packet including the application identifying data and the dispenser condition data.

According to another exemplary embodiment of the present application, a user interactive device includes a housing, a user interactive mechanism carried by the housing, a wireless transmitter storing application identifying data identifying an application associated with the user interactive device, and a controller in circuit communication with the wireless transmitter, wherein the controller is configured to communicate device condition data to the wireless transmitter. The wireless transmitter is configured to wirelessly transmit a broadcast data packet including the application identifying data and the device condition data.

According to another exemplary embodiment of the present application, a system includes a dispenser and a server. The dispenser includes a housing, a container carried by the housing for holding a fluid, an outlet in fluid communication with the container, a dispensing mechanism disposed in the housing and operable to supply the fluid from the container to the outlet, a wireless transmitter storing application identifying data identifying an application associated with the user interactive device, and a controller in circuit communication with the wireless transmitter and configured to communicate dispenser condition data to the wireless transmitter. The wireless transmitter is configured to wirelessly transmit a broadcast data packet including the application identifying data and the dispenser condition data to a mobile device when the mobile device is in proximity with the dispenser. The server receives the dispenser condition data from the mobile device.

According to another exemplary embodiment of the present application, a system includes a user interactive device and a server. The user interactive device includes a housing, a user interface carried by the housing, a wireless transmitter storing application identifying data identifying an application associated with the user interactive device, and a controller in circuit communication with the wireless transmitter, wherein the controller is configured to communicate device condition data to the wireless transmitter. The wireless transmitter is configured to wirelessly transmit a broadcast data packet including the application identifying data and the device condition data to a mobile device when the mobile device is in proximity with the user interactive device. The server receives the device condition data from the mobile device.

According to another exemplary embodiment of the present application, a method is contemplated for monitoring usage activity at a user interactive device. In the exemplary method, a first data packet is received at a first server remote from the user interactive device, from a mobile device, with the first data packet including a universally unique identifier (UUID) identifying the user interactive device, a major value, and a minor value, with at least one of the major value and the minor value defining device condition data corresponding to a current condition of the user interactive device and device location data corresponding to a location of the user interactive device. A second data packet is transmitted from the first server for receipt by a second server, with the second data packet including the device condition data. A location specific notification is transmitted from the first server to the mobile device, with the location specific notification being based on the device location data.

DETAILED DESCRIPTION

Figure 1:
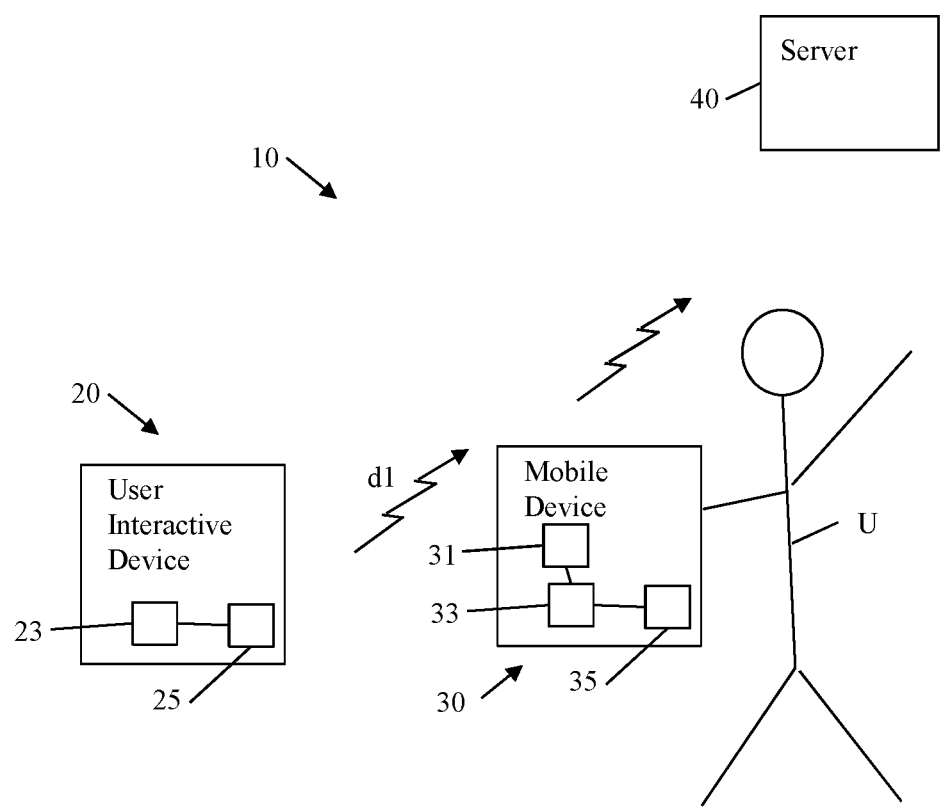
FIG. 1 is a schematic view of a monitoring system for a user interactive device, according to an exemplary embodiment of the present application.

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning.

Also, while certain exemplary embodiments described in the specification and illustrated in the drawings relate to battery powered, "hands free," hand hygiene fluid dispensers, it should be understood that many of the inventive features described herein may be applied to other devices, systems, and methods. For example, the features described herein may be utilized in other types of dispensers, including manually operated dispensers, or other electrically powered devices.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

"Logic," as used herein, is synonymous with "circuit" or "circuitry" and includes, but is not limited to, hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

"Signal," includes, but is not limited to one or more electrical signals, analog or digital signals, one or more computer instructions, a bit or bit stream, or the like.

Any values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

Devices involving proximate or "in person" user interaction, such as, for example, dispensing devices (e.g., soap dispensers, sanitizer dispensers, beverage machines, vending machines), non-dispensing service devices (e.g., hand dryers), diagnostic devices (e.g., blood pressure monitors), and display devices (e.g., touchscreens displaying schedule information, instructional information, or advertising), often generate information that would be of interest to a device owner or administrator that is remote from the device. For example, user interactive devices may be configured to generate information corresponding to a need for some form of device maintenance, such as, for example, refilling depleted materials carried by a dispensing device, replacing depleted batteries, replacing materials for which an expiration date has passed, or repair of improperly functioning or non-functioning devices. As another example, user interactive devices may collect information related to usage of the device, including, for example, time or date of use, usage frequency, type or amount of use, or indications of improper use or tampering. To process, analyze, and/or act on this device information, the information may be transmitted as data signals, periodically and/or on demand, to a server, computer, or other wireless communication device accessible by the owner/administrator.

While data generated by a user interactive device may be communicated directly from the device to a remote owner/administrator, for example, by WiFi, cellular network, or other long range wireless communication from a transmitter provided with the user interactive device, such communications are relatively power intensive and may therefore be infeasible or disfavored for devices operating on limited battery power, and/or devices requiring frequent transmission of information. To allow for reduced power demands on a data transmitting user interactive device, a second electronic device having wireless communication capabilities, proximate to the user interactive device, may be configured to receive device data from the user interactive device through short range wireless communication, for example, passive or active radio-frequency identification (RFID) communication, Near Field Communication (NFC), Bluetooth® communication, Bluetooth® low energy (BLE) communication, or infrared (IR) communication. The second electronic device may then relay the received device data to the remote owner/administrator using long range wireless communication (e.g., WiFi or cellular network communication). The relaying electronic device may be a substantially fixed device placed in proximity with the user interactive device, and may have ready access to a more sustainable, rechargeable, or continuous power source. In other embodiments, as contemplated by the present application, portable electronic devices carried by the users of the user interactive device may be used to relay the device data generated by the user interactive device to the remote owner/administrator.

With the increasing personal use of portable electronic devices having wireless communication capabilities (e.g. smart phones, tablets, smart watches, activity monitors, and other "wearable technology"), it may be expected that a significant portion of the users of a user interactive device will be carrying at least one electronic device capable of wirelessly relaying device data generated by the user interactive device to a remote owner or administrator of the device. Exemplary embodiments disclose systems utilizing these user carried electronic devices ("mobile devices") to wirelessly receive device generated device data from a user interactive device, and to subsequently transmit the device data from the mobile device to a remote owner or administrator of the user interactive device, to process, analyze, and/or act on this device information.

FIG. 1 illustrates an exemplary system 10 including a user interactive device 20, a user carried mobile device 30 that may be brought into proximity with the user interactive device by a user U, and a remote server 40 accessible by the owner or administrator of the user interactive device. The user interactive device 20 includes a controller 23 configured to generate and/or collect device condition data relating to a condition of the user interactive device (e.g., related to power supply, usage, device performance, or materials for dispensing, and the like) and a wireless radio or transmitter 25 in circuit communication with the controller 23 to wirelessly transmit a first data packet d1. Packet d1 may include device condition data and device identification data (e.g., identifying the identity and/or location of the public device). Wireless transmitter 25 may transmit, for example, continuously, periodically (e.g., once every 100-1000 ms), or as prompted (e.g., by an interrogation from the mobile device or by use of the user interactive device). The mobile device 30 includes a first, short range transceiver or antenna 31 for receiving the transmitted data packet, a controller 33 for evaluating the received data packet, and a second, long range transceiver or antenna 35 for transmitting a second data packet d2, including at least a portion of the device condition data and the device identification data, to the remote server 40.

In some embodiments, the mobile device 30 is a smart phone or a tablet. In some embodiments, an application running on the smart phone or tablet collects information from the interactive device when the smart phone or tablet is in close proximity. In some embodiments, the mobile device 30 transmits the collected data to the cloud.

According to an aspect of the present application, to maximize the number of mobile devices configured to relay device generated data, a user interactive device may be configured to transmit device condition data in a format configured to be received by a mobile device having mobile application software configured to recognize the data packets, process the data, and transmit at least a portion of the data to a remote server or other such computing device. Many different types of wireless signal transmitting devices may be used to generate wireless data signals recognized by signal processing software applications. One such signal transmitting device is a "beacon" transmitter device, such as a Bluetooth® beacon, configured for periodic one-way communication of a data packet. An exemplary Bluetooth® beacon device is an iBeacon® protocol (an Apple iOS-based standard) beacon device that periodically (e.g., every 100-1000 ms) transmits or broadcasts a BLE data packet including a fixed 16-byte universally unique identifier (UUID), a changeable 2-byte major value, a changeable 2-byte minor value, and a 1-byte "TX" signal strength identifier. The UUID identifies an application associated with the source of the device, for example, specific to a goods manufacturer, a retail store chain, a restaurant chain, a hospital system, or any other entity for which a mobile tracking application is to be utilized. The major value customarily identifies a general location of the beacon (e.g., a store, restaurant, office building), while the minor value customarily identifies the individual beacon (e.g., the beacon's unique identity or its specific sub-location within the general location). The TX identifier identifies the signal strength of the beacon at a predetermined distance (e.g., 1 meter) from the beacon, allowing the mobile device to determine its distance from the beacon based on a signal strength measured by the mobile device.

According to an aspect of the present application, a controller of a user interactive device can be configured to modify a portion of the broadcast data to include current device condition data as generated or collected by the controller. In the exemplary embodiment using a Bluetooth® beacon, the primary application identifying UUID portion of the broadcast data may remain unchanged, to maintain its functionality as a fixed source identifier to be recognized by the mobile app, while a portion of the major and minor values may be changed to reflect the device condition data. In one such embodiment, the major and minor values of the broadcast data are sufficient to store both device locating (e.g., global coordinates or descriptive location information) or identifying (e.g., device serial number or dispenser refill serial number) data for the user interactive device and the device condition data. As one example, three of the four bytes of major and minor value data may be dedicated to the device serial number, with the fourth byte of major and minor value data being dedicated to the device condition data.

When the mobile device receives the broadcast signal packet, an operating system or software application on the mobile device may evaluate the UUID to "look up" or query a stored database of UUID's to determine if the mobile device has (e.g., stored in a controller of the mobile device) any mobile applications ("apps") with which the beacon is associated, alerting any such apps that a relevant beacon has been found. An app recognizing the UUID includes an application programming interface (API) configured to initiate communication of the mobile device with a remote server, to transmit the broadcast data to the remote server. The remote server evaluates the broadcast data to identify both the specific user interactive device from which the data was received, and the conditions for which condition data had been transmitted. The remote server may use this information to generate alerts, reports, or other information for transmission to the owner or administrator of the device (e.g., by e-mail, text message, web-based or app-based notifications).

Many different types of mobile apps may be used for remote server communication of device condition data. Examples include gaming applications, shopping applications, information applications, learning applications, diagnostic applications, and scheduling applications. The mobile apps may be configured to push notifications to the user that relate directly to the purpose of the application (e.g., location based services, scheduling notifications) or tangentially related or unrelated notifications (e.g., advertising or promotions).

A controller (e.g., a processor, a printed circuit board (PCB) based controller, or the like) of a user interactive device may be used to modify a broadcast data packet to include, as part of the device condition data, information about a variety of conditions associated with the user interactive device. For example, the broadcast data packet may be modified to include a low battery condition identifier, as determined by the controller based on actuation counts, or a voltage measurement of the battery. As another example, the broadcast data packet may be modified to include a device performance indicator (e.g., motor performance of a dispenser or hand dryer). As still another example, the broadcast data packet may be modified to include a time of last use/actuation of the device, or a cumulative usage count, for remote monitoring of usage (or non-usage) of the device. As yet another example, in the case of a dispenser (e.g., soap or sanitizer dispenser), the broadcast data packet may be modified to include a low fluid condition identifier, as determined, for example, by a fluid level sensor in communication with the controller.

While many mobile devices include global positioning system (GPS) or cellular tracking technology for locating the device, GPS locating services are not available indoors (or other locations where satellite signals are blocked) and cellular tower triangulation cannot identify an accurate precise location. Accordingly, in addition to supplying device condition data and device identification data to a remote server, the transmission of this data via a user carried mobile device can also provide an indication to the remote server of the existence of a user in proximity with the user interactive device, a function that may be performed by Bluetooth® beacons and other such beacon-type transmitting devices in combination with mobile apps configured to process the broadcast data of the beacon. To further pinpoint the location of the mobile device carrying user, a measure of the transmitted signal's strength by the mobile device can allow the mobile device to determine its proximity to, or distance from, the beacon, and a measure of the signal strength of signals from two or more proximate beacons, each having a known location, can allow the mobile device to determine its exact location (e.g., through signal strength triangulation). The mobile app may be configured to transmit, along with any broadcast data, additional user information stored on the user's mobile device (e.g., demographics, buying habits, activities and interests), as consented to by the user when the mobile app is downloaded onto the user's mobile device. By evaluating the precise location and personal characteristics of the user, the remote server may transmit (or "push") information to the user (e.g., by e-mail, text message, or through the mobile app itself) that is tailored to the user's location and characteristics. For example, the remote server may transmit advertising, promotions, or coupon codes to the user that correspond to a location in a grocery store or shopping mall and/or to identified buying habits and/or preferences of the user. As another example, the remote server may transmit information about nearby locations (e.g., wait times for service locations, special events).

While device condition information and user location information may both be of interest to the same owner/administrator of the user interactive device, in some applications, the user location information may be of interest to a first or user monitoring party (e.g., retailer or service provider for which the user is an existing or potential customer), and the device condition information may be of interest to a second or device monitoring party (device supplier, owner, device servicing agent, quality control manager, or device usage compliance personnel). In such an embodiment, the broadcast data may be sent by the mobile device to a first server under the control of one of the user monitoring party and the device monitoring party, and the first server may relay the pertinent portion of the broadcast data to a second server under the control of the other of the user monitoring party and the device monitoring party.

Figure 2:
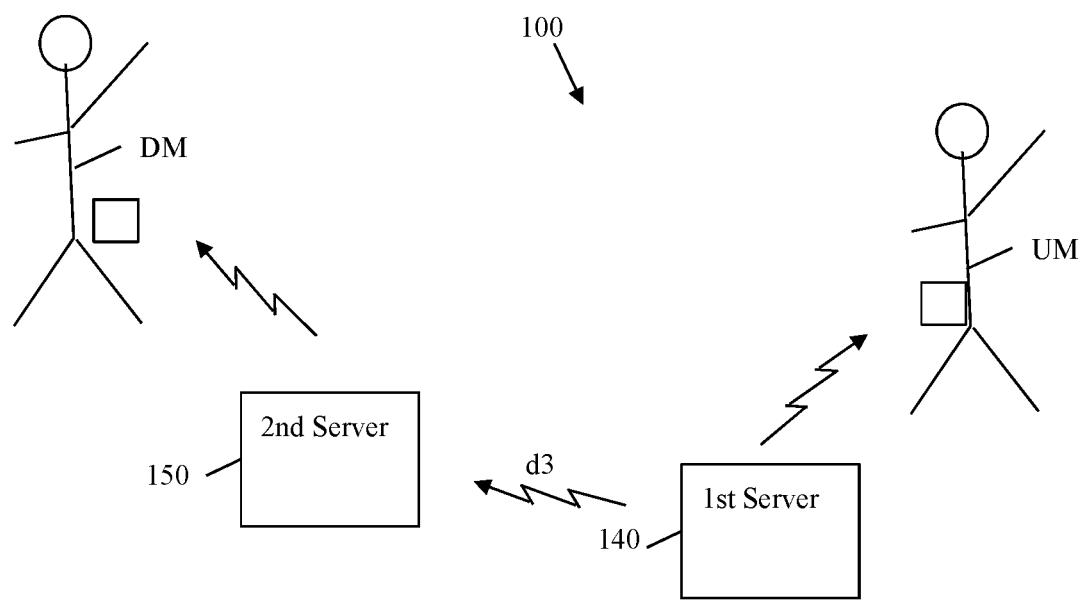
FIG. 2 is a schematic view of another monitoring system for a user interactive device, according to an exemplary embodiment of the present application.
Figure 2:
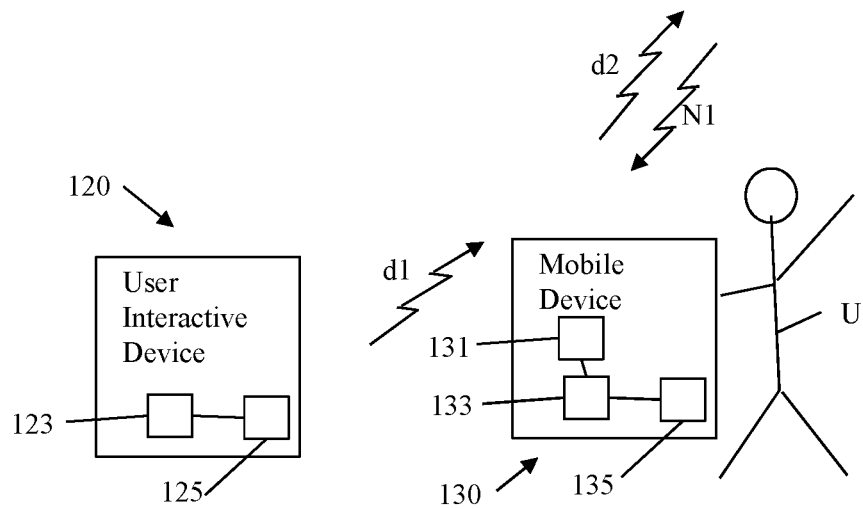

FIG. 2 illustrates another exemplary system 100 including a user interactive device 120, a user carried mobile device 130 that may be brought into proximity with the user interactive device by a user U, a first remote server 140 accessible by a user monitoring entity UM, and a second remote server 150 accessible by a device monitoring entity DM. The user interactive device 120 includes a controller 123 configured to generate and/or collect condition data corresponding to a condition of the user interactive device (e.g., related to power supply, usage, or materials for dispensing) and a wireless radio or transmitter 125 in circuit communication with the controller 123 to wirelessly transmit a first data packet d1 including the condition data, along with application identifying data (e.g., allowing a mobile app to recognize the data packet as data to be processed) and device identification data (e.g., identifying the identity and/or location of the public device), for example, continuously, periodically (e.g., once every 100-1000 ms), or as prompted (e.g., by an interrogation from the mobile device or by use of the user interactive device). The mobile device 130 includes a first, short range transceiver or antenna 131 for receiving the transmitted data packet, a controller 133 for evaluating the received data packet and storing user identification data, and a second, long range transceiver or antenna 135 for transmitting a second data packet d2, including the device condition data, the device identification data, and the user identification data, to the first remote server 140. The first remote server 140 is configured to evaluate the device identification data and the user identification data, and may (but need not) transmit to the long range transceiver 135 of the mobile device 130 a notification n1 (e.g., advertising, promotions, location services, or "push" notifications) specific to at least one of an identity of the user U and a current location of the user, for display on the mobile device. The first remote server 140 may also notify the user monitoring entity UM (e.g., by text message, e-mail, or web-based reporting) of the presence of users at the beacon, either individually or in the aggregate over a predetermined period of time.

The first remote server 140 is further configured to transmit to the second remote server 150 a third data packet d3 including the device condition data, for example, to alert the device monitoring entity DM of a current condition (e.g., low battery, low fluid in a dispenser) of the user interactive device 120 (e.g., by text message, e-mail, or web-based reporting). In some systems and applications, the supplying of beacon-carrying user interactive devices may be a source of revenue for the owner/administrator of the user device (which may, but need not, be the device monitoring entity DM), by providing the user monitoring entity UM with identifications of potential customers at known locations. For such an arrangement, the transmission of the device condition data to the second remote server 150 may identify to the device owner/administrator an instance of a user identification for which a user identification fee may be owed.

Figure 3:
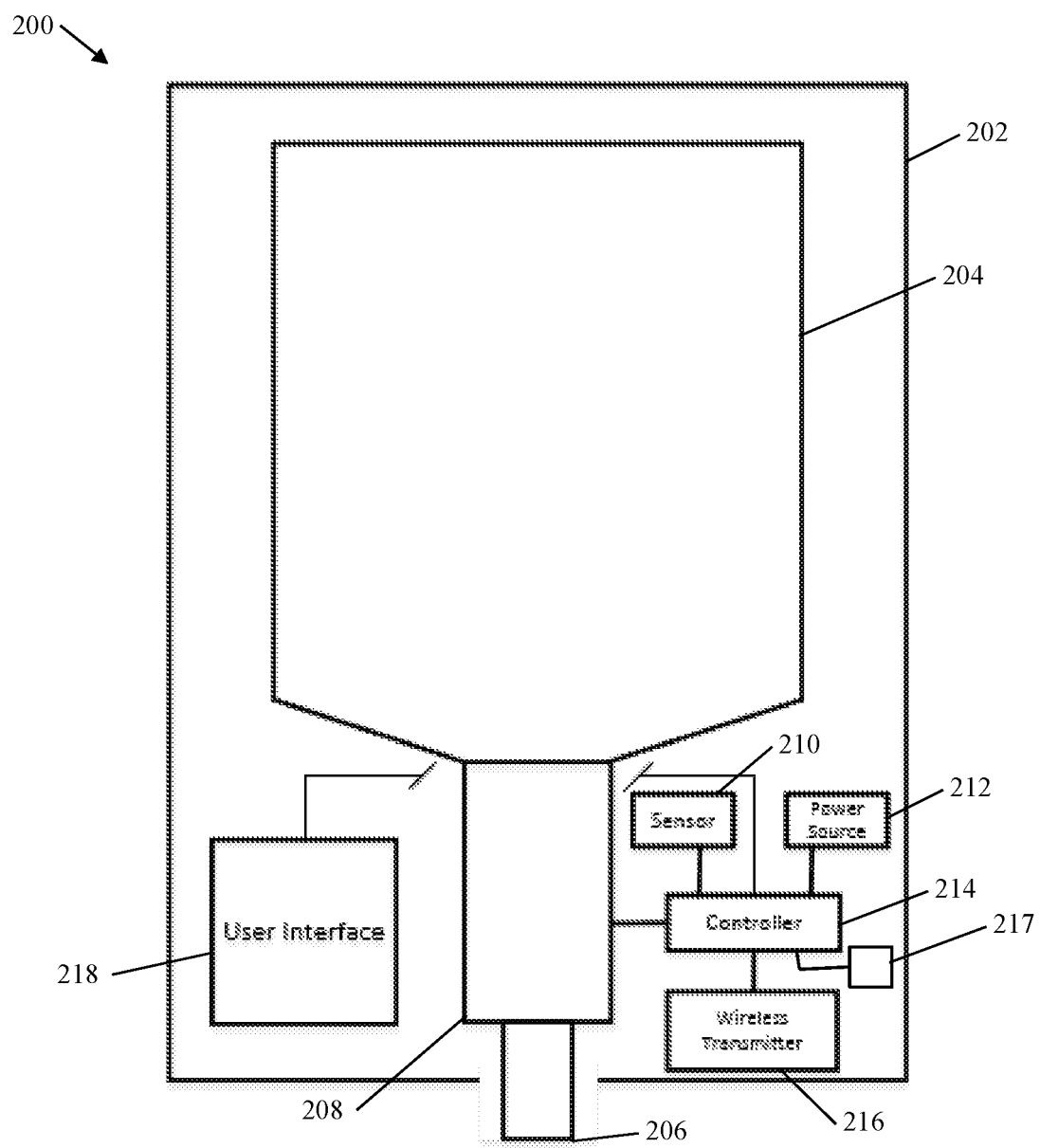
FIG. 3 is a schematic view of a exemplary dispenser, according to an exemplary embodiment of the present application.

As described above, many different types of user interactive devices may utilize the condition monitoring and notification technology described herein. FIG. 3 illustrates an exemplary embodiment of a dispenser 200 adapted to provide condition-based data in accordance with the present application. The fluid dispenser 200 includes a fluid storing reservoir 204 and a dispensing mechanism 208 (e.g., an actuator/motor and pump) disposed in a housing 202, and a spout or nozzle portion 206 carried by the housing and connected to the reservoir 204. The housing 202 may include a panel, door, or shell portion (not shown) that is removable to facilitate replacement or refilling of the reservoir 204.

The dispensing mechanism 208 is operable to pump or otherwise facilitate the flow of fluid from the reservoir 204 through the nozzle 206 in response to user manipulation of a user interface (shown schematically at 218). The user interface may include any suitable manual, electromechanical, or electronic actuating mechanism, including, for example, a manually depressible hand bar or plunger, an electrical switch engaging button, or a "hands free" voice, optic, motion, or proximity sensor. In the schematically illustrated example, the dispenser 200 includes a dispenser actuating controller 214 in circuit communication with the electronic user interface 218, an electrically powered dispensing mechanism 208 (e.g., a motor operated pump), and a battery 212. When the controller 214 receives an actuation signal from the user interface 218, the controller initiates battery powered operation of the dispensing mechanism 208 to dispense fluid from the reservoir 204 through the nozzle 206.

In addition to controlling operation of the dispensing mechanism 208, the controller 214 (which may include multiple sub-controllers in circuit communication with each other) is operable to generate or receive device condition data for monitoring the condition of the dispenser, for example, to provide a device owner or administrator with one or more "service alerts" identifying required maintenance. For example, the controller may be operable to generate battery charge status data (e.g., as measured by a voltmeter, or based on actuation and/or time based counts from a fully charged condition) during normal operation of the dispenser. The controller may generate data (e.g., data for broadcasting) that identifies the specific battery level, or merely whether the battery is sufficiently charged (based on a predetermined threshold) or in a low charge (i.e., needing battery recharge or replacement) condition. As another example, the controller 214 may receive additional condition-based data from one or more sensors 210 installed in the dispenser 200. For example, a fluid level sensor may be assembled with the reservoir 204 and operable to measure a fill level of the reservoir and to transmit a signal to the controller 214 corresponding to the measured fill level. Examples of fluid level sensors include weight sensors (e.g., strain gauge, force sensitive resistor, potentiometer, optic sensor, or other weighing sensor) or fluid level float sensors. The controller may generate data (e.g., data for broadcasting) that identifies the specific fluid level, or merely whether the fluid level is sufficient (based on a predetermined threshold) in a low fluid level (i.e., needing fluid refill) condition.

Still other data may be collected by the controller for subsequent broadcasting to a mobile device. As one example, the controller may additionally or alternatively generate dispenser usage data (e.g., time or frequency of use) for monitoring current, cumulative, or historical dispenser usage. This data may provide information about the success of a hand hygiene compliance program. For example, the server collecting the dispenser usage data may compare the frequency of dispenser usage to the number of mobile devices that pass within a detectable range of the dispenser (as recognized by the relaying of beacon data to the server by in-range mobile devices). As another example, hand hygiene compliance may be evaluated on an individual basis by the transmission of usage data from a specific mobile device, along with user identification stored on that specific mobile device, to determine if the owner of the mobile device used the dispenser during his or her time in proximity with the dispenser.

As another example, the controller may receive fluid identification data corresponding to a fluid refill (e.g., serial number, expiration data), for example, through circuit communication between circuitry on the fluid reservoir (not shown) and the controller, to track the fluid being dispensed and to identify the need or opportunity for fluid replacement, for example, based on expiration of the fluid or identification of a fluid that has been recalled or discontinued.

The controller 214 is in circuit communication with a wireless transmitter 216 (e.g., a Bluetooth® beacon, as described above) to communicate the dispenser condition data to a memory of the transmitter 216. Where the transmitter is a Bluetooth® beacon using the iBeacon® protocol, the dispenser condition data is written in at least one of the major and minor value portions of a broadcast data packet including the UUID, major and minor values, and TX value. The transmitter 216 periodically (e.g., every 100 to 1000 ms) transmits or broadcasts the broadcast data packet, which is received by any mobile device within range of the dispenser that includes a receiver configured to receive the broadcast data packet, and with a mobile app programmed to recognize the UUID, for transmission to a remote server, as described above. In one example, mobile device relays of the broadcast data packet may be correlated with identified usage (or non-usage) of the dispenser, for device monitoring entity comparison of dispenser usage opportunities with actual usage of the dispenser (e.g., for evaluating a hand hygiene compliance program).

The dispenser 200 may additionally include a receiver 217 in circuit communication with the controller 214 and configured to receive data from the mobile device (e.g., via RFID, WiFi, or Bluetooth® communication), for example, to generate additional dispenser condition data for subsequent transmission to one or more mobile devices in proximity with the dispenser 200. For example, the mobile device may transmit to the receiver 217 data identifying the user (based on the carried mobile device). As another example, the mobile device may transmit to the receiver 217 location data (e.g., GPS, cellular triangulation, WiFi-based, or dead reckoning navigation) to identify to the controller 214 an estimated location of the dispenser 200 (e.g., in applications where the location of the installed dispenser is not known).

Figure 4:
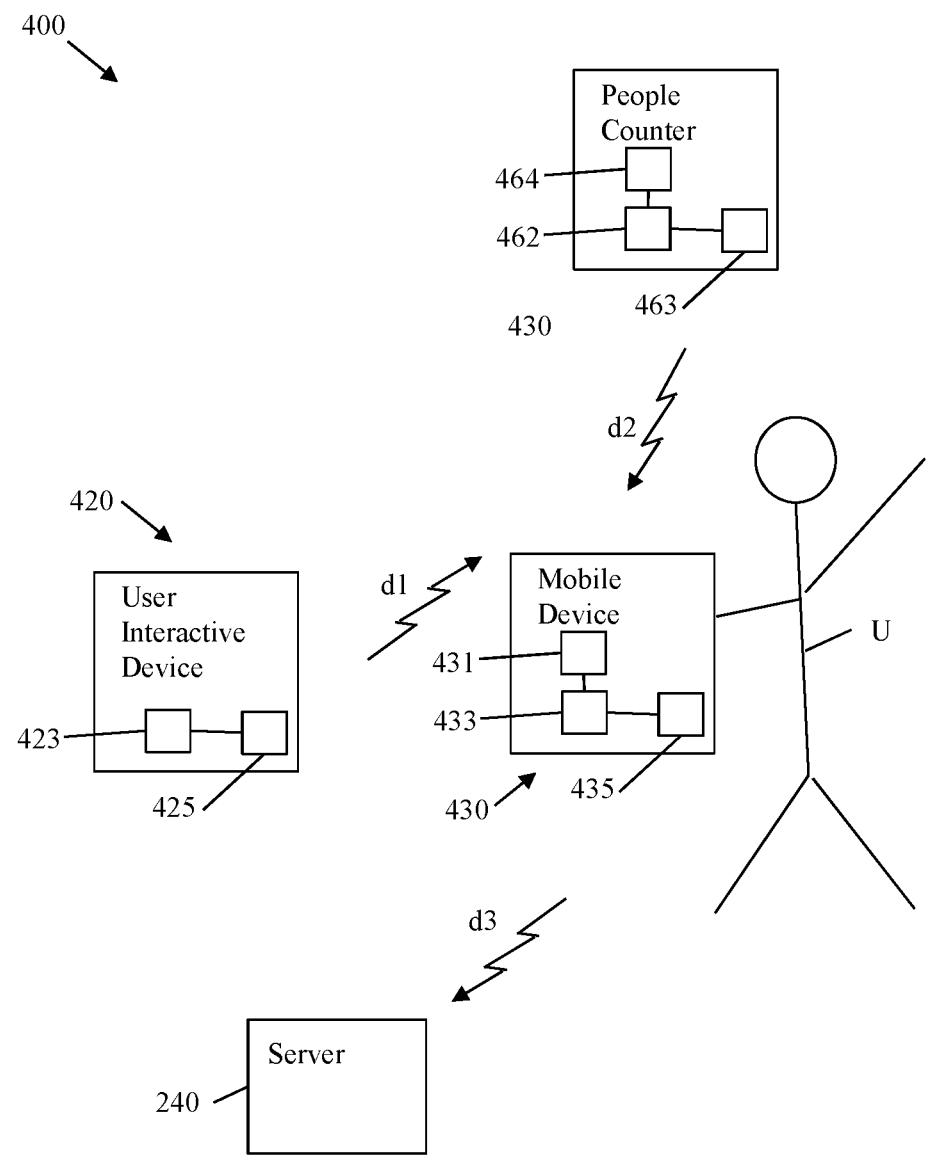
FIG. 4 is a schematic view of an exemplary monitoring system for an interactive device and people counters.

FIG. 4 illustrates an exemplary system 400 including a user interactive device 420, a people counter 460, a user carried mobile device 430 (that may be brought into proximity with the user interactive device and the people counter 460 by a user U), and a remote server 440. The user interactive device 420 includes a controller 423 configured to generate and/or collect device condition data relating to a condition of the user interactive device (e.g., related to power supply, usage, device performance, or materials for dispensing, and the like) and a wireless radio or transmitter 425 in circuit communication with the controller 423 to wirelessly transmit a first data packet d1. Packet d1 may include device condition data and device identification data (e.g., identifying the identity and/or location of the public device). Wireless transmitter 425 may transmit, for example, continuously, periodically (e.g., once every 100-1000 ms), or as prompted (e.g., by an interrogation from the mobile device or by use of the user interactive device). In the instant example, the user interactive device 420 is a soap or sanitizer dispenser.

The people counter 460 includes a controller 462 configured to generate and/or collect data indicative of a personnel entering or leaving an area that may be detected by sensor 463. In some embodiments, the controller 462 also detects device condition data relating to a condition of the people counter (e.g., bad sensor, low power) and a wireless radio or transmitter 464 in circuit communication with the controller 462 to wirelessly transmit a second data packet d2. Packet d2 may include the number of people entering or leaving an area, device condition data and device identification data (e.g., identifying the identity and/or location of the people counter). Wireless transmitter 463 may transmit, for example, continuously, periodically (e.g., once every 100-1000 ms), or as prompted (e.g., by an interrogation from the mobile device or by use of the user interactive device).

The mobile device 430 includes a first, short range, transceiver or antenna 431 for receiving the transmitted data packets d1, d2, a controller 433 for evaluating the received data packets, and a second, long range, transceiver or antenna 435 for transmitting a third data packet d3. D3 may include one or more of device condition data, device usage data, time of device usage, device identification data, and number of people entering an area, time of entries into area, to the remote server 440.

One of the features of this exemplary system 400 is that is that, in addition to having the ability to do one or more of the features identified above, it may be used to track hand hygiene compliance at a group level. The compliance data may be, for example, an indicator that is based on the number of dispense events for every hand hygiene opportunity. The number of dispense events is based on the number of times the user interactive device 420 (in this case a soap or sanitizer dispenser) dispenses a dose of product. The number of hand hygiene opportunities may be the number of people entering or leaving an area which is detected by people counter 460. In some embodiments, the number of hand hygiene opportunities may be a fraction of the number of people entering or leaving the area, such as, for example, if it may be determined that only 1 hand hygiene opportunity exists for every 2 counts on the people counter. This situation may occur, for example, if a person is counted when they enter an area and when they leave an area and the facility determines that this should only result in 1 hand hygiene opportunity for those 2 counts. The compliance number may be monitored and displayed on the remote server 440 and/or on the mobile device 430. In some embodiments, if the compliance rate falls below a threshold, a notification is provided to a supervisor so they can investigate into why and encourage a higher compliance rate. In some embodiments, the mobile device 430 is a stationary device that is located in close enough proximity to the user interactive device 420 and the people counter, but otherwise performs the same function.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A dispenser including:
   a housing;
   a container carried by the housing for holding a fluid;
   an outlet in fluid communication with the container;
   a dispensing mechanism disposed in the housing and operable to supply the fluid from the container to the outlet;
   a wireless transmitter storing application identifying data identifying an application associated with a user interactive device;
   a controller in circuit communication with the wireless transmitter, wherein the controller is configured to communicate dispenser condition data to the wireless transmitter; and
   wherein the wireless transmitter is a beacon transmitter that is configured to periodically wirelessly transmit a broadcast data packet including the application identifying data and the dispenser condition data without establishing a connection with a user interactive device receiving the data packet; and
   wherein when a user interactive device includes an application software that is identified by the application identifying data, and
   wherein the application software causes the user interactive device to recognize the data packet, process the data and transmit at least a portion of the data to a remote computing device.

2. The dispenser of claim 1, wherein the wireless transmitter comprises one of a Bluetooth® beacon and an iBeacon® protocol beacon device.

3. The dispenser of claim 1, wherein the application identifying data comprises a universally unique identifier (UUID).

4. The dispenser of claim 1, wherein the dispenser condition data comprises data corresponding to at least one of a battery charge level, motor performance information, a fluid fill level, usage of the dispenser, cumulative usage of the dispenser, time of use of the dispenser, fluid identification data, and user identification data.

5. The dispenser of claim 1, wherein the broadcast data packet further includes dispenser location data.

6. The dispenser of claim 1, further comprising a fluid fill level sensor in communication with the controller to provide fluid fill level data to the controller, wherein the dispenser condition data includes the fluid fill level data.

7. The dispenser of claim 1, wherein the broadcast data packet further includes mobile device location data.

8. The dispenser of claim 1, wherein the controller generates the dispenser condition data in response to user actuation of dispensing mechanism.

9. A system comprising:
   a dispenser including:
   a housing;
   a container carried by the housing for holding a fluid;
   an outlet in fluid communication with the container;
   a dispensing mechanism disposed in the housing and operable to supply the fluid from the container to the outlet;
   a wireless transmitter storing application identifying data identifying an application associated with the user interactive device; and
   a controller in circuit communication with the wireless transmitter, wherein the controller is configured to communicate dispenser condition data to the wireless transmitter;
   wherein the wireless transmitter is a beacon that is configured to periodically wirelessly transmit a broadcast data packet including the application identifying data and the dispenser condition data without establishing a connection with a mobile device;
   wherein when a mobile device is in proximity with the dispenser, and the mobile device has application software that is identified by the application identifying data, the application software causes the mobile device to recognize the data packet, process the data and transmit at least a portion of the data; and a remote computing device for receiving the data transmitted from the mobile device.

10. The system of claim 9, wherein the broadcast data packet further including the dispenser location data.

11. The system of claim 9, wherein the dispenser condition data comprises data corresponding to at least one of a battery charge level, a fluid fill level, frequency of usage of the dispenser, cumulative usage of the dispenser, time of use of the dispenser, fluid identification data, and user identification data.

12. The system of claim 9, wherein the controller generates the dispenser condition data in response to user actuation of dispensing mechanism.

13. The system of claim 9, wherein the dispenser condition data comprises usage data corresponding to time of use of the dispenser.

14. A system comprising:
a soap or sanitizing dispenser including:
a housing;
a container carried by the housing for holding a soap or sanitizer;
a dispensing mechanism for causing soap or sanitizer to be dispensed from the container;
a wireless transmitter that is a beacon that periodically transmits a signal without establishing a connection with a mobile device; and
memory;
application identifying data identifying an application configured to wirelessly receive data from the soap or sanitizer dispenser; and
a controller in circuit communication with the wireless transmitter;
wherein the controller causes the wireless transmitter to continuously wirelessly transmit a broadcast data packet including the application identifying data and a dispenser condition data to a mobile device that contains application software that is identified by the application identifying data and causes the mobile device to receive the data packet when the mobile device is in proximity with the dispenser, process that data pack and transmitting at least a portion of the data to a remote computing device.

15. The system of claim 14 further comprising an application for a mobile device, wherein the application is configured to receive application identifying data and the dispenser condition.

16. The system of claim 15 further comprising a mobile device.

17. The system of claim 16 further comprising a server for receiving the dispenser condition data from the mobile device.

18. The system of claim 15 wherein the dispenser condition is indicative of a usage rate.

19. The system of claim 15 wherein the dispenser condition is indicative of a volume of soap or sanitizer.

* * * * *